United States Patent
Park et al.

(10) Patent No.: US 11,845,418 B2
(45) Date of Patent: Dec. 19, 2023

(54) METHOD OF CONTROLLING ENGINE AND TRANSMISSION OF HYBRID VEHICLE

(71) Applicants: Hyundai Motor Company, Seoul (KR); Kia Motors Corporation, Seoul (KR)

(72) Inventors: Jun Sung Park, Gyeonggi-do (KR); Jaebin Lee, Gyeonggi-do (KR); Tae Won Hwang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 147 days.

(21) Appl. No.: 16/952,329

(22) Filed: Nov. 19, 2020

(65) Prior Publication Data
US 2022/0032901 A1 Feb. 3, 2022

(30) Foreign Application Priority Data
Jul. 28, 2020 (KR) .......... 10-2020-0093632

(51) Int. Cl.
| | |
|---|---|
| B60W 10/02 | (2006.01) |
| B60W 20/15 | (2016.01) |
| B60W 10/06 | (2006.01) |
| B60W 10/10 | (2012.01) |
| B60W 10/08 | (2006.01) |
| B60W 30/18 | (2012.01) |

(52) U.S. Cl.
CPC ............ *B60W 20/15* (2016.01); *B60W 10/06* (2013.01); *B60W 10/08* (2013.01); *B60W 10/10* (2013.01); *B60W 30/18072* (2013.01); *B60W 2510/0638* (2013.01); *B60W 2510/1005* (2013.01); *B60W 2520/10* (2013.01)

(58) Field of Classification Search
CPC ...... B60W 10/06; B60W 10/08; B60W 10/10; B60W 20/15; B60W 30/18072; B60W 2510/0638; B60W 2510/1005; B60W 2520/10; B60K 6/485
See application file for complete search history.

(56) References Cited

U.S. PATENT DOCUMENTS

| | | | | |
|---|---|---|---|---|
| 5,727,522 A | * | 3/1998 | Otani ..................... | F02P 5/1508 123/339.11 |
| 6,307,277 B1 | * | 10/2001 | Tamai ................... | B60W 10/06 290/40 C |
| 6,376,927 B1 | * | 4/2002 | Tamai ................... | B60K 6/383 290/31 |

(Continued)

*Primary Examiner* — Gonzalo Laguarda
(74) *Attorney, Agent, or Firm* — Fox Rothschild LLP

(57) ABSTRACT

A method of controlling an engine and a transmission of a vehicle, which is a hybrid vehicle, includes the following steps that are carried out by a controller: determining whether the vehicle is under NCC (Neutral Coasting Control), determining whether an engine RPM reaches an engine RPM control point if it is determined that the NCC is in effect, determining an RPM and a gear stage of a vehicle transmission if it is determined that the engine RPM has reached the engine RPM control point, determining an engine target RPM of the vehicle, determining whether the engine RPM has reached a mild hybrid starter & generator (MHSG) control point, and controlling the MHSG according to a condition if it is determined that the engine RPM has reached the MHSG control point.

7 Claims, 12 Drawing Sheets

(56) References Cited

U.S. PATENT DOCUMENTS

| | | | |
|---|---|---|---|
| 7,758,467 B2* | 7/2010 | Ashizawa | B60W 20/00 477/5 |
| 8,515,645 B2* | 8/2013 | Bucci | F02D 29/06 701/99 |
| 10,589,733 B2* | 3/2020 | Kim | B60W 30/18072 |
| 2021/0339732 A1* | 11/2021 | Lee | F02D 41/2422 |
| 2022/0025971 A1* | 1/2022 | Park | B60W 10/02 |

* cited by examiner

FIG. 10

| Division | 0 | 5 | 10 | ..... | 200kph |
|---|---|---|---|---|---|
| 1 Stage | 700 | 700 | 700 | ..... | 700 |
| 2 Stage | 700 | 700 | 700 | ..... | 700 |
| ..... | ..... | ..... | ..... | ..... | ..... |
| 6 Stage | 700 | 700 | 1300 | ..... | 2000 |
| 7 Stage | 700 | 700 | 1300 | ..... | 2000 |

METHOD OF CONTROLLING ENGINE AND TRANSMISSION OF HYBRID VEHICLE

CROSS-REFERENCE TO RELATED APPLICATION

This application claims under 35 U.S.C. § 119 the benefit of Korean Patent Application No. 10-2020-0093632 filed in the Korean Intellectual Property Office on Jul. 28, 2020, the entire contents of which are incorporated herein by reference.

BACKGROUND

(a) Technical Field

The present disclosure relates to a method of controlling an engine and a transmission of a hybrid vehicle, more particularly, to the method of controlling the engine and the transmission of the hybrid vehicle that can smoothly improve a vehicle acceleration feeling when the hybrid vehicle is accelerated after a neutral control (NCC) is released by controlling engine RPM to follow a target engine RPM when the hybrid vehicle is accelerated after the NCC is released, and thereafter, by controlling a mild hybrid starter & generator (MHSG) RPM to follow a MHSG target RPM using the MHSG motor in a low RPM region.

(b) Description of the Related Art

As is well known, hybrid electric vehicles (or "hybrid vehicles") use both an internal combustion engine and battery power. That is, the hybrid vehicle efficiently combines and uses the power of the internal combustion engine and the power of the motor.

Hybrid vehicles can be classified into a mild type and a hard type according to a power sharing ratio between the engine and the motor. A mild hybrid vehicle is provided with a mild hybrid starter & generator (MHSG) that starts an engine or generates power by output of the engine instead of an alternator. In the hard-type hybrid vehicle, a starting generator that starts an engine (or generates power by an output of the engine) and a drive motor that drives the vehicle are separately provided.

Mild hybrid vehicles can use a MHSG to assist engine torque according to driving conditions and charge a battery (e.g., a 48 V battery) through regenerative braking. Accordingly, the fuel efficiency of the mild hybrid vehicle can be improved.

Meanwhile, in a 48 V hybrid system, SSC (Start & Stop coasting) technology that satisfies fuel economy and eco-friendly regulations by turning off the transmission clutch under certain conditions and turning off the engine, and NCC (Neutral Coasting Control) technology that only turns off the transmission clutch under certain conditions is used. SSC is a control technology that completely turns off engine start by continuously decreasing clutch and engine RPM under certain conditions after releasing the pedal, and NCC is a control technology that decreases clutch RPM by turning off only the clutch so that engine RPM decreases to some extent.

However, as shown in FIGS. 1 to 3 (RELATED ART), when the vehicle is accelerated after entering the NCC, the response is delayed and the RPM is excessively increased, and noise and fuel economy due to the excessive increase in RPM are deteriorated. In addition, there is a problem in that the vehicle rumbling due to clutch control occurs.

Therefore, consistency of engine RPM behavior is required during vehicle acceleration after NCC is released. Accordingly, there is a need for an engine and transmission control technology that can improve ride comfort/drivability/fuel economy/NVH (noise, vibration, harshness).

The above information disclosed in this Background section is only for enhancement of understanding of the background of the disclosure, and therefore it may contain information that does not form the prior art that is already known in this country to a person of ordinary skill in the art.

SUMMARY

The present disclosure provides a method of controlling an engine and a transmission of a hybrid vehicle that can improve vehicle acceleration smoothly by controlling the engine RPM, when the vehicle is accelerated after neutral control (NCC) is released, and by controlling a mild hybrid starter & generator (MHSG) RPM to follow a MHSG target RPM using a starting generator (i.e., the MHSG) in a specific RPM area.

A method of controlling an engine and a transmission of a vehicle (e.g., a hybrid vehicle) according to an exemplary embodiment of the present disclosure includes determining, by the controller, whether the vehicle is under NCC (Neutral Coasting Control); determining, by the controller, whether an engine RPM reaches an engine RPM control point if it is determined that the NCC is in effect; determining, by the controller, an RPM and a gear stage of a vehicle transmission if it is determined that the engine RPM has reached the engine RPM control point; determining, by the controller, an engine target RPM of the vehicle; determining, by the controller, whether the engine RPM has reached a mild hybrid starter & generator (MHSG) control point; and controlling the MHSG according to a condition if it is determined that the engine RPM has reached the MHSG control point.

The method of controlling the engine and the transmission of a hybrid vehicle according to an exemplary embodiment of the present disclosure may further include after determining, by the controller, whether the engine RPM has reached the MHSG control point, determining, by the controller, whether the engine RPM has slipped compared to the engine target RPM if it is determined that the engine RPM has not reached the MHSG control point, performing, by the controller, proportional-integral-derivative (PID) control to follow the engine target RPM if the controller determines that the engine RPM has slipped compared to the target engine RPM, and determining whether the controller satisfies a control escape condition, and if the control escape condition is satisfied, terminating the control.

The method of controlling the engine and the transmission of a hybrid vehicle according to an exemplary embodiment of the present disclosure may further include determining whether the engine RPM has reached the MHSG control point if the controller determines that the engine RPM has not reached the engine RPM control point, determining, by the controller, the RPM and the gear level of the transmission if it is determined that the engine RPM has reached the MHSG control point, determining, by the controller, an MHSG target RPM of the vehicle, determining, by the controller, whether the engine RPM has slipped compared to the MHSG target RPM, performing, by the controller, a motor speed control to follow the MHSG target RPM if it is determined that the engine RPM has slipped compared to the MHSG target RPM, and determining whether the controller satisfies the control escape condition, and if the control escape condition is satisfied, terminating the control.

The method of controlling the engine and the transmission of a hybrid vehicle according to an exemplary embodiment of the present disclosure may further include after determining, by the controller, whether the engine RPM has reached the MHSG control point, determining, by the controller, the RPM and the gear level of the transmission if it is determined that the engine RPM has reached the MHSG control point, determining, by the controller, an MHSG target RPM of the vehicle, determining, by the controller, whether the engine RPM has slipped compared to the MHSG target RPM, performing, by the controller, a motor speed control to follow the MHSG target RPM if it is determined that the engine RPM has slipped compared to the MHSG target RPM, and determining whether the controller satisfies the control escape condition, and if the control escape condition is satisfied, terminating the control.

The method of controlling the engine and the transmission of a hybrid vehicle according to an exemplary embodiment of the present disclosure may further include after determining, by the controller, whether the engine RPM has slipped compared to the MHSG target RPM, if the controller determines that the engine RPM does not slip compared to the MHSG target RPM, and determining whether the controller satisfies the control escape condition, if the control escape condition is satisfied, terminating the control.

In determining, by the controller, an engine target RPM of the vehicle, the controller determines the current vehicle speed, and the controller sets the engine target RPM according to a first map table previously set for the current vehicle speed and gear stage.

Performing PID control to follow the engine target RPM is performed by adjusting the ignition timing of the engine with fast response and adjusting the opening amount of the throttle with strong persistence.

In a situation in which the engine RPM is overshot compared to the engine target RPM, the controller controls the engine ignition timing to be retarded and to reduce the throttle opening amount.

In a situation in which the engine RPM is undershot compared to the engine target RPM, the controller controls to advance the engine ignition timing and increase the throttle opening amount.

In determining, by the controller, whether the engine RPM has reached the MHSG control point, if the engine RPM is 700 rpm/sec or less, the controller determines that the MHSG control point has been reached.

The motor speed control is to perform target speed tracking control based on motor current control.

A non-transitory computer readable medium containing program instructions executed by a processor, the computer readable medium comprising: program instructions that determine whether a vehicle is under NCC (Neutral Coasting Control); program instructions that determine whether an engine RPM reaches an engine RPM control point if it is determined that the NCC is in effect; program instructions that determine an RPM and a gear stage of a transmission if it is determined that the engine RPM has reached the engine RPM control point; program instructions that determine an engine target RPM of the vehicle; program instructions that determine whether the engine RPM has reached a mild hybrid starter & generator (MHSG) control point; and program instructions that control the MHSG according to a condition if it is determined that the engine RPM has reached the MHSG control point.

According to an exemplary embodiment of the present disclosure, when the vehicle is accelerated after the neutral control (NCC) is released, the consistency of engine RPM behavior can be ensured, the acceleration feeling of the vehicle can be smoothly improved, and fuel economy, environmental regulations, and drivability can all be improved.

BRIEF DESCRIPTION OF THE DRAWINGS

FIG. 10 is a table showing an exemplary first map table for determining an engine target RPM in a method for controlling an engine and transmission of a hybrid vehicle according to an exemplary embodiment of the present disclosure.

DETAILED DESCRIPTION OF THE EMBODIMENTS

Figure 1:
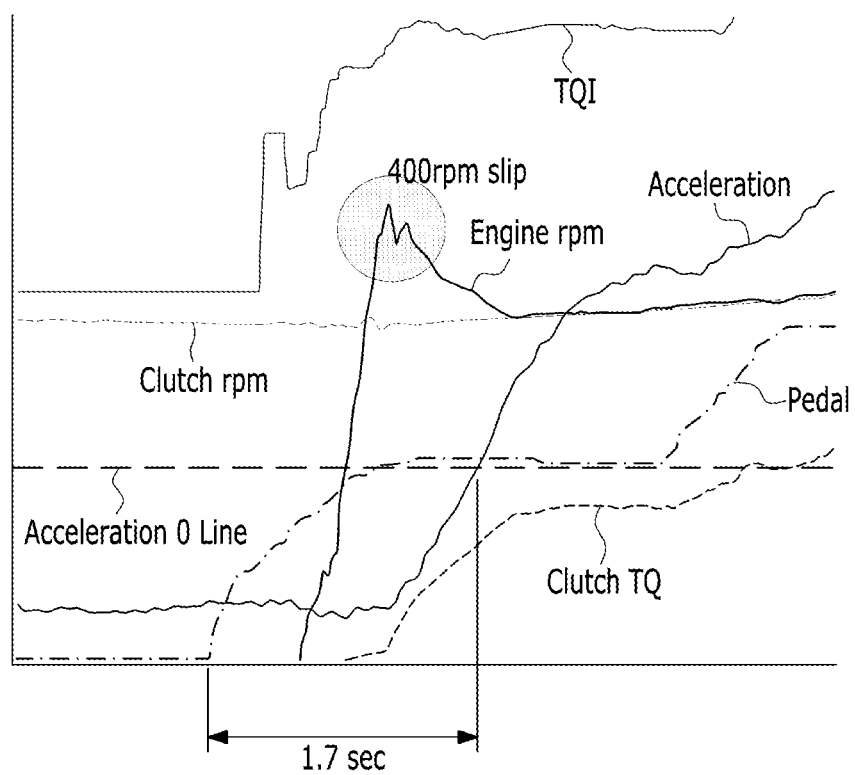
FIG. 1 (RELATED ART) is a diagram showing a state of a response delay and excessive engine RPM when the engine is restarted after a conventional NCC is released.
Figure 2:
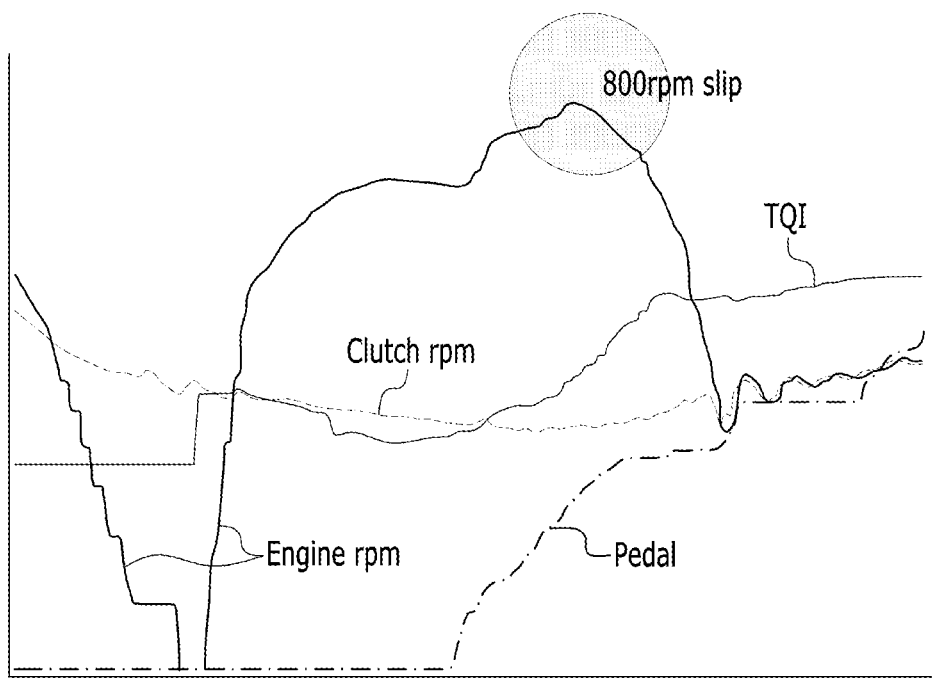
FIG. 2 (RELATED ART) is a view showing a state of noise and fuel economy deterioration due to excessive engine RPM when the engine is restarted after the conventional NCC is released.
Figure 3:
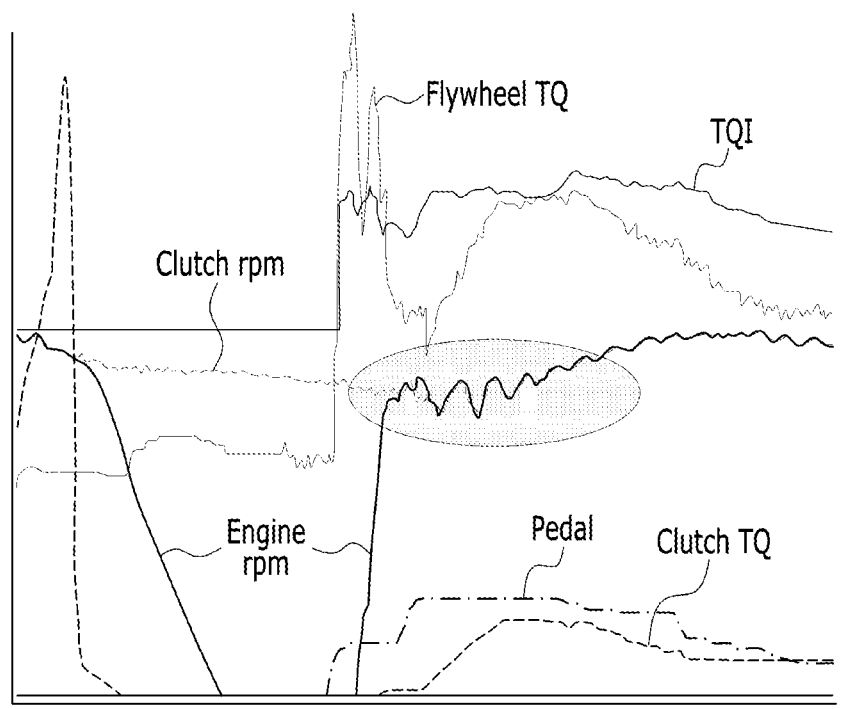
FIG. 3 (RELATED ART) is a diagram showing a change in engine RPM which is unstable due to clutch control when the engine is restarted after the conventional NCC is released.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

Further, in exemplary embodiments, since like reference numerals designate like elements having the same configuration, a first exemplary embodiment is representatively described, and in other exemplary embodiments, only configurations different from the first exemplary embodiment will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use same reference numerals for showing similar features. It will be understood that when an element such as a layer, film, region, or substrate is referred to as being "on" another element, it can be directly on the other element or intervening elements may also be present.

The exemplary embodiment of the present disclosure shows an exemplary embodiment of the present disclosure in detail. As a result, various modifications of the drawings will be expected. Therefore, the exemplary embodiment is not limited to a specific aspect of the illustrated region, and for example, includes modifications of an aspect by manufacturing.

Now, a method of controlling an engine and a transmission of a hybrid vehicle according to an exemplary embodiment of the present disclosure will be described with reference to FIG. 4 and FIG. 9.

Figure 4:
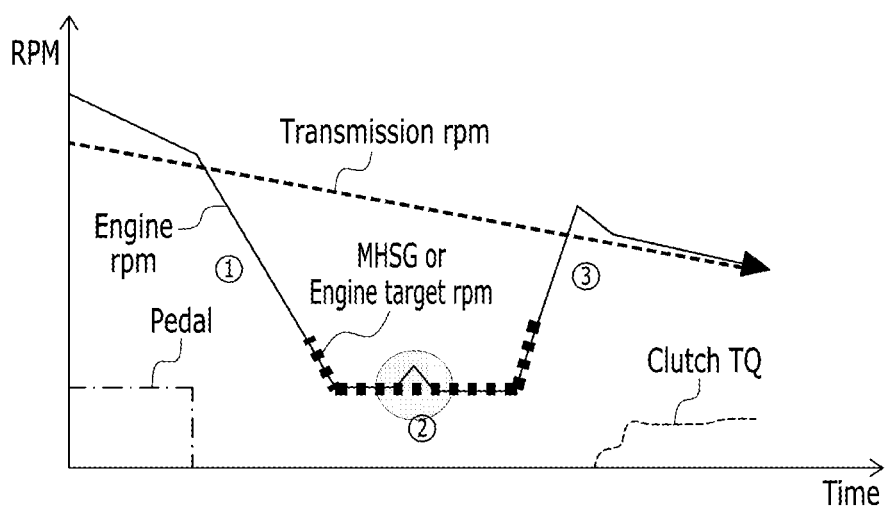
FIG. 4 is a view showing a change in engine RPM according to MHSG or engine target RPM tracking control among NCCs of a vehicle according to an exemplary embodiment of the present disclosure.
Figure 9:
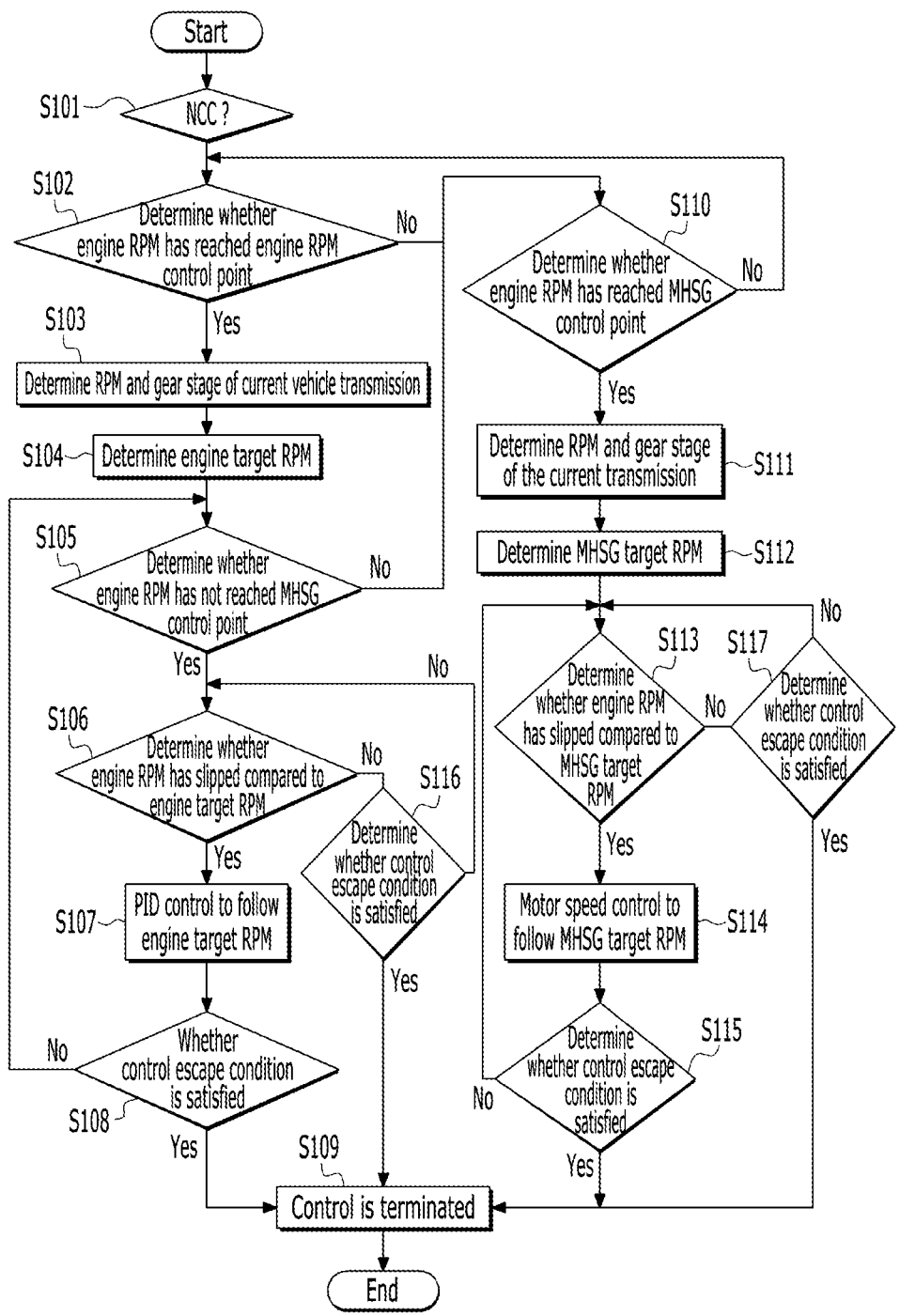
FIG. 9 is a flowchart illustrating a method of controlling an engine and a transmission of a hybrid vehicle according to an exemplary embodiment of the present disclosure.

FIG. 4 is a view showing a change in engine RPM according to MHSG or engine target RPM tracking control among NCCs of a vehicle according to an exemplary embodiment of the present disclosure, and FIG. 9 is a flowchart illustrating a method of controlling an engine and a transmission of a hybrid vehicle according to an exemplary embodiment of the present disclosure.

First, in a method of controlling an engine and a transmission of a hybrid vehicle according to an exemplary embodiment of the present disclosure, the controller determines whether the vehicle is under NCC (Neutral Coasting Control) (S101). In this case, the controller may be, for example, one or more microprocessors (e.g., an ECU (Engine Control Unit or Electronic Control Unit)) operated by a program or hardware including the microprocessor. In addition, the program may include a series of instructions for performing the engine and transmission control method of a hybrid vehicle according to an exemplary embodiment of the present disclosure.

After that, if it is determined that the NCC is in effect, the controller determines whether the engine RPM has reached the engine RPM control point (S102). At this time, determining whether the engine RPM reaches the engine RPM control point may be determined according to the characteristics of the vehicle/48 V system. As shown in FIG. 4, after a driver takes his or her foot off the accelerator pedal, the engine RPM decreases (①), and it is determined whether the engine RPM reaches the engine RPM control point at an appropriate time.

After that, when it is determined that the engine RPM has reached the engine RPM control point, the controller determines the RPM and the gear stage of a transmission of the vehicle (i.e., current vehicle transmission) (S103). A determination as to whether the engine RPM has reached the engine RPM control point may be set according to the tip-out shock of the vehicle. It is possible to set the engine RPM control point when there is no problem with the vehicle in terms of shock when performing tip-out by taking a foot off the accelerator pedal of the vehicle. As shown in FIG. 4, in the process of linearly decreasing engine RPM after taking the foot off the accelerator pedal, an arbitrary point in time when the tip-out is not excessive on the vehicle in terms of shock is set as the engine RPM control point, and is switched to the NCC control area.

Then, the controller determines the engine target RPM of the vehicle (S104). In this case, the target engine RPM of the vehicle may be determined using a map table set in advance according to the hardware characteristics of the engine. The controller may determine the current vehicle speed, and the controller may set the engine target RPM based on a first map table preset for the current vehicle speed and gear stage.

FIG. 10 is a table showing an exemplary first map table for determining an engine target RPM in a method for controlling an engine and transmission of a hybrid vehicle according to an exemplary embodiment of the present disclosure. Referring to FIG. 10, the engine target RPM can be set to 700 RPM with a low fixed engine RPM of a simple N-speed level. Accordingly, it is possible to follow the same control as in the diagram showing the change in engine RPM according to MHSG or engine target RPM tracking control among the NCC of the vehicle of FIG. 4.

After that, the controller determines whether the engine RPM has reached the MHSG control point (S105). If it is determined that the engine RPM has not reached the MHSG control point, the controller determines whether the engine RPM has slipped compared to the engine target RPM (S106). As shown in FIG. 4, the controller determines whether a slip (bounce) phenomenon of engine RPM has occurred (②) during NCC control.

If the controller determines that the engine RPM has slipped compared to the engine target RPM, the controller performs proportional-integral-derivative (PID) control to follow the engine target RPM (S107). In this case, the step of controlling to follow the target RPM of the engine may be performed by adjusting an ignition timing of the engine with high responsiveness and adjusting an opening amount of the throttle with strong persistence.

In a situation where the engine RPM is overshot compared to the engine target RPM, the controller can control the engine ignition timing to be delayed and to reduce the throttle opening amount.

In a situation where the engine RPM is undershot compared to the engine target RPM, the controller may control to advance the engine ignition timing and increase the throttle opening amount.

Figure 11:
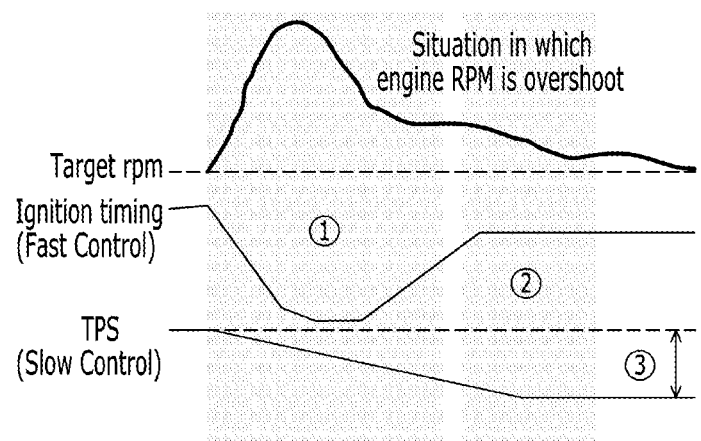
FIG. 11 is a conceptual diagram illustrating PID control for following an engine target RPM in an overshoot situation in which engine RPM is compared to an engine target RPM in a method for controlling an engine and transmission of a hybrid vehicle according to an exemplary embodiment of the present disclosure.
Figure 12:
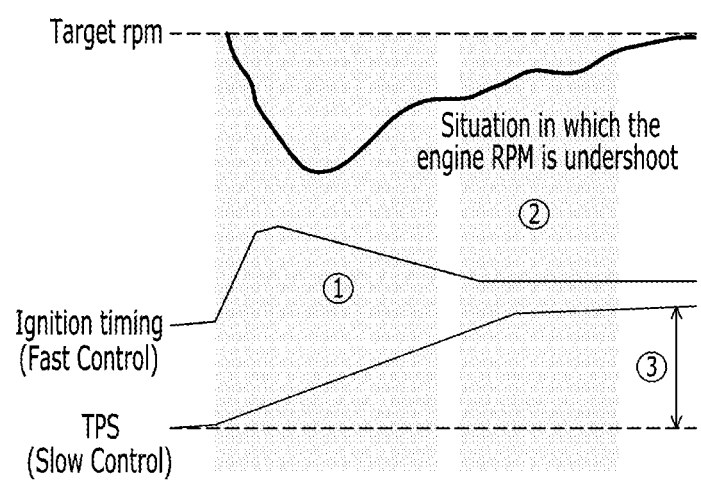
FIG. 12 is a conceptual diagram illustrating PID control for following an engine target RPM in an undershoot situation in which an engine RPM is compared to an engine target RPM in an engine and transmission control method of a hybrid vehicle according to an exemplary embodiment of the present disclosure.

FIG. 11 is a conceptual diagram illustrating PID control for following an engine target RPM in an overshoot situation in which engine RPM is compared to an engine target RPM in a method for controlling an engine and transmission of a hybrid vehicle according to an exemplary embodiment of the present disclosure, and FIG. 12 is a conceptual diagram illustrating PID control for following an engine target RPM in an undershoot situation in which an engine RPM is compared to an engine target RPM in an engine and transmission control method of a hybrid vehicle according to an exemplary embodiment of the present disclosure.

Referring to FIG. 11, when the engine RPM is overshot compared to the engine target RPM, the controller retards the engine ignition timing in the ignition timing oriented control section (①) among P and D gains with fast response, and controls to reduce the throttle opening amount in the throttle opening amount oriented control section (②) among the P and D gains, which have a slow response but are advantageous in terms of persistence. Then, the controller completes the correction by reflecting the deviation of the throttle opening amount to I gain in the ③ section.

Referring to FIG. 12, when the engine RPM is undershot compared to the engine target RPM, the controller advances the engine ignition timing in the ignition timing oriented control section (①) and controls to increase the throttle opening amount in the throttle opening amount oriented control section (②). Then, the controller completes the correction by reflecting the deviation of the throttle opening amount to I gain in the ③ section.

By PID control according to FIGS. 11 and 12, by removing the slip phenomenon of the engine RPM of FIGS. 4 to 8 and controlling the engine RPM to follow the engine target RPM, it is possible to smoothly improve the feeling of deceleration and the noise of the vehicle.

After that, the controller determines whether a control escape condition is satisfied (S108). At this time, the control escape condition may be, for example, when exiting from D stage, when acceleration occurs by operating the pedal by the driver, when the vehicle speed condition (especially during deceleration) in which NCC cannot be controlled anymore, and when sudden deceleration braking occurs, etc.

After that, when the control escape condition is satisfied, the control is terminated (S109).

After the engine target RPM tracking control of the engine RPM as above ends, acceleration is generated by the driver operating the pedal to enter the area ③ shown in FIG. 4, and the engine RPM and the transmission RPM are synchronized.

Meanwhile, after the step of determining, by the controller, whether the engine RPM has reached the engine RPM control point (S102), if the controller determines that the engine RPM has not reached the engine RPM control point, it is determined whether the engine RPM has reached the MHSG control point (S110). At this time, in determining whether the engine RPM has reached the MHSG control point, if it falls within a preset MHSG controllable area for each gear stage/vehicle speed, it may be determined to switch to MHSG control. For example, when the engine RPM is 700 rpm/sec or less, the controller may determine that the MHSG control point has been reached.

When it is determined that the engine RPM has reached the MHSG control point, the controller determines the RPM and gear stage of the current vehicle transmission (S111).

Then, the controller determines the MHSG target RPM of the vehicle (S112). In this case, the MHSG target RPM of the vehicle may be determined using a preset map table according to hardware characteristics of the MHSG, and the same table as the first map table of FIG. 10 for determining the engine target RPM may be used.

Thereafter, the controller determines whether the engine RPM has slipped compared to the MHSG target RPM (S113). As shown in FIG. 4, the controller determines whether a slip (bounce) phenomenon has occurred (②) compared to the MHSG target RPM of the engine RPM.

If it is determined that the engine RPM has slipped compared to the MHSG target RPM, the controller performs motor speed control to follow the MHSG target RPM (S114). In this case, the motor speed control may be performing target speed tracking control based on motor current control.

Thereafter, the controller determines whether the control escape condition is satisfied (S115), and when the control escape condition is satisfied, the control ends (S109). At this time, the control escape condition may be, for example, when exiting from D stage, when acceleration occurs by operating the pedal by the driver, when the vehicle speed condition (especially during deceleration) in which NCC cannot be controlled anymore, and when sudden deceleration braking occurs, etc.

If it is determined that the engine RPM has no slip compared to the MHSG target RPM, the controller determines whether the control escape condition is satisfied (S117), and when the control escape condition is satisfied, the control is terminated (S109).

Meanwhile, after the step of determining, by the controller, whether the engine RPM has reached the MHSG control point (S105), if it is determined that the engine RPM has reached the MHSG control point, the process may proceed to step (S110) and the above-described steps may be performed. That is, the controller determines the RPM and the gear level of the current vehicle transmission (S111), and determines the MHSG target RPM of the vehicle (S112).

In addition, after the step of determining, by the controller, whether the engine RPM has slipped compared to the target engine RPM (S106), if the controller determines that the engine RPM does not slip compared to the engine target RPM, it determines whether the controller satisfies the control escape condition (S116), and when the control escape condition is satisfied, the control ends (S109). As previously explained, the control escape condition may be, for example, when exiting from D stage, when acceleration occurs by operating the pedal by the driver, when the vehicle speed condition (especially during deceleration) in which NCC cannot be controlled anymore, and when sudden deceleration braking occurs, etc.

In addition, after the step of determining, by the controller, whether the engine RPM has slipped compared to the MHSG target RPM (S113), if the controller determines that the engine RPM does not slip compared to the MHSG target RPM, it determines whether the controller satisfies the control escape condition (S117), and when the control escape condition is satisfied, the control ends (S109).

Figure 5:
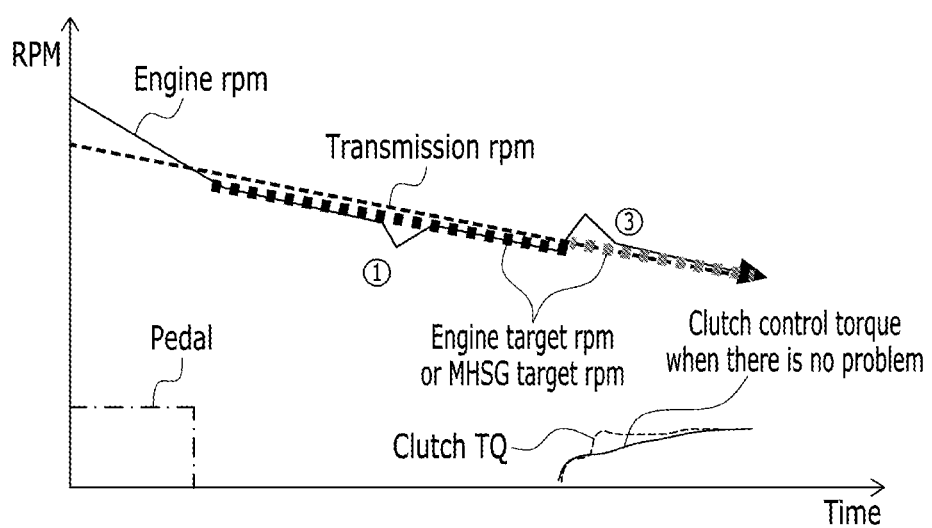
FIG. 5 is a diagram showing a change in engine RPM when direct deceleration control similar to AT is intervened among NCCs of a vehicle according to an exemplary embodiment of the present disclosure.

FIG. 5 is a diagram showing a change in engine RPM when direct deceleration control similar to AT is intervened among NCCs of a vehicle according to an exemplary embodiment of the present disclosure. Referring to FIG. 5, as a case where the direct deceleration control similar to the AT is additionally intervened in the general NCC control of FIG. 4, it may be selectively used in an area where response delay or shock/jerk should be improved when the vehicle is re-accelerated. In the area ① of FIG. 5, as shown in FIG. 4, it is determined whether the engine RPM slips relative to the target engine RPM, and if the slip occurs, PID control is performed to follow the engine target RPM. Also, the clutch control torque in the ③ area can be intervened in the form of correction.

Figure 6:
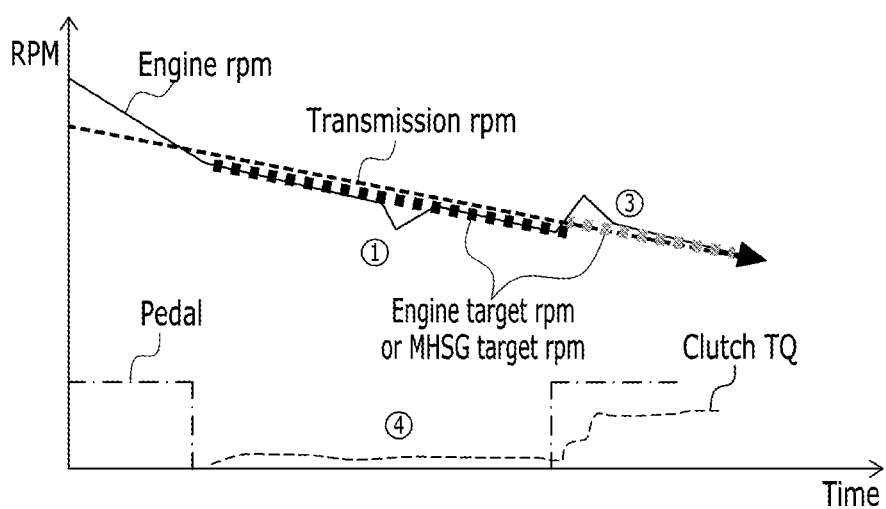
FIG. 6 is a view showing a change in engine RPM when a direct deceleration control similar to an AT is intervened and a clutch torque is pre-applied among NCCs of a vehicle according to an exemplary embodiment of the present disclosure.

FIG. 6 is a view showing a change in engine RPM when a direct deceleration control similar to an AT is intervened and a clutch torque is pre-applied among NCCs of a vehicle according to an exemplary embodiment of the present disclosure. The control shown in FIG. 6 is the same as that of FIG. 5, except that the clutch torque is applied in advance, so that the responsiveness increases when controlling the clutch in the area ③. This is more effective during rapid acceleration.

Figure 7:
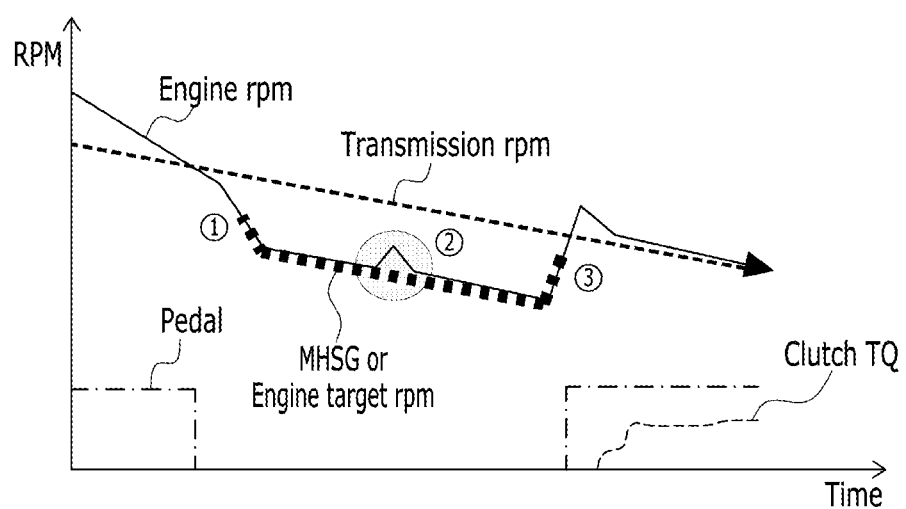
FIG. 7 is a view showing a change in engine RPM when MHSG or engine target RPM tracking control and direct deceleration control similar to AT are intervened among NCCs of a vehicle according to an exemplary embodiment of the present disclosure.

FIG. 7 is a view showing a change in engine RPM when MHSG or engine target RPM tracking control and direct deceleration control similar to AT are intervened among NCCs of a vehicle according to an exemplary embodiment of the present disclosure. FIG. 7 is a compromise type when control among the NCC of FIG. 4 and direct deceleration control similar to the AT of FIG. 5 are intervened. In the area where response delay or shock/jerk should be improved upon re-acceleration and when the control of FIG. 6 is implemented, control can be performed by adjusting the engine target RPM in an area where fuel economy deterioration is large.

Figure 8:
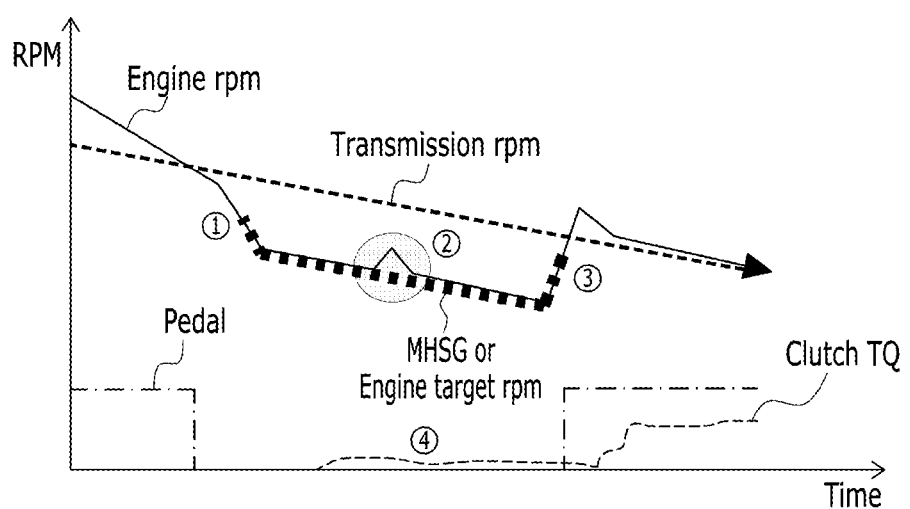
FIG. 8 is a view showing a change in engine RPM when MHSG or engine target RPM tracking control and direct deceleration control similar to AT are intervened and clutch torque is pre-applied among NCC of a vehicle according to an exemplary embodiment of the present disclosure.

FIG. 8 is a view showing a change in engine RPM when MHSG or engine target RPM tracking control and direct deceleration control similar to AT are intervened and clutch torque is pre-applied among NCC of a vehicle according to an exemplary embodiment of the present disclosure. The control shown in FIG. 8 is the same as that of FIG. 7, except that the clutch torque is applied in advance, so that responsiveness is increased during clutch control in the area ③.

Like this, according to an exemplary embodiment of the present disclosure, by controlling the engine RPM, when the vehicle is accelerated after the neutral control (NCC) is released, by controlling the MHSG RPM to follow the MHSG target RPM using a starting generator (MHSG) in a specific RPM area, and by selectively adding AT-level deceleration direct control, it is possible to improve the acceleration of the vehicle smoothly, and improve fuel efficiency, environmental regulations, and drivability.

While this disclosure has been described in connection with what is presently considered to be practical exemplary embodiments, it is to be understood that the disclosure is not limited to the disclosed embodiments. On the contrary, it is intended to cover various modifications and equivalent arrangements included within the spirit and scope of the appended claims.

What is claimed is:

1. A method of controlling an engine and a transmission of a vehicle, comprising:
   determining, by a controller, whether the vehicle is under NCC (Neutral Coasting Control);
   determining, by the controller, whether an engine RPM reaches an engine RPM control point if it is determined that the NCC is in effect;
   determining, by the controller, an RPM and a gear stage of the transmission if it is determined that the engine RPM has reached the engine RPM control point;
   determining, by the controller, an engine target RPM of the vehicle;
   determining, by the controller, whether the engine RPM has reached a mild hybrid starter & generator (MHSG) control point;
   controlling the MHSG according to a condition if it is determined that the engine RPM has reached the MHSG control point;
   after determining, by the controller, whether the engine RPM has reached the MHSG control point,
     determining, by the controller, whether the engine RPM has slipped compared to the engine target RPM if it is determined that the engine RPM has not reached the MHSG control point;
     performing, by the controller, proportional-integral-derivative (PID) control to follow the engine target RPM if the controller determines that the engine RPM has slipped compared to the target engine RPM; and
     determining whether the controller satisfies a control escape condition, and if the control escape condition is satisfied, terminating the control;
   determining whether the engine RPM has reached the MHSG control point if the controller determines that the engine RPM has not reached the engine RPM control point;
     determining, by the controller, the RPM and the gear level of the transmission if it is determined that the engine RPM has reached the MHSG control point;
     determining, by the controller, an MHSG target RPM of the vehicle;
     determining, by the controller, whether the engine RPM has slipped compared to the MHSG target RPM;
     performing, by the controller, a motor speed control to follow the MHSG target RPM if it is determined that the engine RPM has slipped compared to the MHSG target RPM; and
     determining whether the controller satisfies a control escape condition, and if the control escape condition is satisfied, terminating the control;

after determining, by the controller, whether the engine RPM has reached the MHSG control point when it is determined that the engine RPM has reached the engine RPM control point,
- determining, by the controller, the RPM and the gear level of the transmission if it is determined that the engine RPM has reached the MHSG control point;
- determining, by the controller, an MHSG target RPM of the vehicle;
- determining, by the controller, whether the engine RPM has slipped compared to the MHSG target RPM;
- performing, by the controller, a motor speed control to follow the MHSG target RPM if it is determined that the engine RPM has slipped compared to the MHSG target RPM; and
- determining whether the controller satisfies a control escape condition, and if the control escape condition is satisfied, terminating the control; and after determining, by the controller, weather the engine RPM has slipped compared to the MHSG target RPM, if the controller determines that the engine RPM does not slip compared to the MHSG target RPM,
- determining whether the contoller satisfies the control escape condition, and if the control escape condition is satisfied, terminating the control;

wherein, in determining, by the controller, an engine target RPM of the vehicle, the controller determines a current vehicle speed, and the controller sets the engine target RPM according to a first map table previously set for the current vehicle speed and the gear stage; and wherein the NCC is configured to decrease a clutch RPM by turning off only a transmission clutch under predetermined conditions of the vehicle after an macerator pedal of the vehicle is released such that the engine RPM decrease.

2. The method of claim 1, wherein:
performing the PID control to follow the engine target RPM is performed by adjusting an ignition timing of the engine and adjusting an opening amount of the throttle.

3. The method of claim 2, wherein:
in a situation in which the engine RPM is overshot compared to the engine target RPM, the controller controls the engine ignition timing to be retarded and to reduce the opening amount of the throttle.

4. The method of claim 2, wherein:
in a situation in which the engine RPM is undershot compared to the engine target RPM, the controller controls to advance the engine ignition timing and increase the opening amount of the throttle.

5. The method of claim 1, wherein:
in determining, by the controller, whether the engine RPM has reached the MHSG control point,
if the engine RPM is 700 rpm/sec or less, the controller determines that the MHSG control point has been reached.

6. The method of claim 1, wherein:
the motor speed control is to perform target speed tracking control based on motor current control.

7. A non-transitory computer readable medium containing program instructions executed by a processor, the computer readable medium comprising:
program instructions that determine whether a vehicle is under NCC (Neutral Coasting Control);
program instructions that determine whether an engine RPM reaches an engine RPM control point if it is determined that the NCC is in effect;
program instructions that determine an RPM and a gear stage of a transmission if it is determined that the engine RPM has reached the engine RPM control point;
program instructions that determine an engine target RPM of the vehicle;
program instructions that determine whether the engine RPM has reached a mild hybrid starter & generator (MHSG) control point; and
program instructions that control the MHSG according to a condition if it is determined that the engine RPM has reached the MHSG control point;
program instructions that, after determining whether the engine RPM has reached the MHSG control point,
- determine whether the engine RPM has slipped compared to the engine target RPM if it is determined that the engine RPM has not reached the MHSG control point;
- perform proportional-integral-derivative (PID) control to follow the engine target RPM if it is determined that the engine RPM has slipped compared to the target engine RPM; and
- determine whether a control escape condition is satisfied, and if the control escape condition is satisfied, terminating the control;

program instructions that determine whether the engine RPM has reached the MHSG control point if the controller determines that the engine RPM has not reached the engine RPM control point;
- program instructions that determine the RPM and the gear level of the transmission if it is determined that the engine RPM has reached the MHSG control point;
- program instructions that determine an MHSG target RPM of the vehicle;
- program instructions that determine whether the engine RPM has slipped compared to the MHSG target RPM;
- program instructions that perform a motor speed control to follow the MHSG target RPM if it is determined that the engine RPM has slipped compared to the MHSG target RPM; and
- program instructions that determine a control escape condition is satisfied, and if the control escape condition is satisfied, terminating the control;

program instructions that, after determining whether the engine RPM has reached the MHSG control point when it is determined that the engine RPM has reached the engine RPM control point,
- determine the RPM and the gear level of the transmission if it is determined that the engine RPM has reached the MHSG control point;
- determine an MHSG target RPM of the vehicle;
- determine whether the engine RPM has slipped compared to the MHSG target RPM;
- determine a motor speed control to follow the MHSG target RPM if it is determined that the engine RPM has slipped compared to the MHSG target RPM; and
- determine whether the controller satisfies a control escape condition, and if the control escape condition is satisfied, terminating the control; and program instructions that, after determining whether the engine RPM has slipped compared to the MHSG target RPM, if the controller determines that the engine RPM does not slip compared to the MHSG target RPM,
determining whether the contoller satisfies the control escape condition, and if the control escape condition is satisfied, terminating the control;
wherein, in determining an engine target RPM of the vehicle, a current vehicle speed is determined and the engine target RPM is set according to a first map table previously set for the current vehicle speed and gear stage;
wherein the NCC is configured to decrease a clutch RPM by turning off only a transmission clutch under predetermined conditions of the vehicle after an macerator pedal of the vehicle is released such that the engine RPM decrease.

* * * * *